United States Patent [19]

Bonnington

[11] 3,989,769
[45] Nov. 2, 1976

[54] MODIFIED SYNTHETIC THERMOSETTING RESINS AND COMPOSITIONS CONTAINING SAME

[75] Inventor: Michael G. Bonnington, Dudley, England

[73] Assignee: British Industrial Plastics Limited, Manchester, England

[22] Filed: May 28, 1974

[21] Appl. No.: 474,003

[30] Foreign Application Priority Data
June 5, 1973  United Kingdom............... 26897/73

[52] U.S. Cl............................ 260/873; 260/22 CB; 260/40 R; 260/40 TN; 260/859 R; 260/862
[51] Int. Cl.$^2$........................................ C08L 67/06
[58] Field of Search.................. 260/862, 873, 40 R

[56] References Cited
UNITED STATES PATENTS

| | | | |
|---|---|---|---|
| 3,468,972 | 9/1969 | Hsieh | 260/836 |
| 3,476,697 | 11/1969 | Clements | 260/22 |
| 3,518,213 | 6/1970 | Miyoshi | 260/22 |
| 3,577,478 | 5/1971 | Thorpe | 260/862 |
| 3,598,882 | 8/1971 | Brinkmann | 260/873 |
| 3,838,096 | 9/1974 | Nagasawa | 260/862 |

Primary Examiner—Carman J. Seccuro
Attorney, Agent, or Firm—Baldwin, Wight & Brown

[57] ABSTRACT

Thermosetting resins selected from aminoplast, unsaturated polyesters, and cross-linkable high-vinyl polybutadienes and certain derivatives thereof (a thermosetting moulding material containing said resins) are modified by incorporation of up to 50% by weight (based on the total weight) of a low-vinyl polybutadiene or certain derivatives thereof.

4 Claims, No Drawings

MODIFIED SYNTHETIC THERMOSETTING RESINS AND COMPOSITIONS CONTAINING SAME

This invention relates to modified synthetic thermosetting resins and moulding materials containing same.

According to the present invention there is provided a modified synthetic thermosetting resin, comprising
i. a thermosetting resin selected from aminoplasts, phenolics, unsaturated polyesters, cross-linkable polybutadienes comprising predominantly 1.2 polybutadiene having a vinyl content of greater than 50 percent of the unsaturation thereof, hydroxyl-, carboxyl-, mercapto-, and amino-terminated derivatives of said 1.2 polybutadiene, and chain-extended derivatives thereof, and
ii. up to 50% by weight, based on the total weight of (i) and (ii), of a polybutadiene selected from butadiene-based polymers having a vinyl content of up to 50 percent of the unsaturation thereof, hydroxyl-, carboxyl-, mercapto-, and amino-terminated derivatives of said butadiene-based polymers, and chain-extended derivitives thereof.

For simplicity, the polybutadienes which may form component (i) will be referred to hereafter as "high-vinyl polybutadiene", and the polybutadiene which forms component (ii) will be referred to as "low-vinyl polybutadiene".

The low-vinyl polybutadiene may be present in an amount up to 50 percent by weight of the total resin weight, and preferably is within the range from 20 to 50 percent by weight, more preferably within the range from 25 to 50 percent by weight. Suitable chain-extended low- or high-vinyl polybutadienes are obtained by reacting a urethane or epoxy compound or other co-reactive chain-extending agent with a —OH, —COOH, —SH or —NH$_2$ terminated poly-butadiene.

The thermosetting resin (i) may also be chain-extended, and it is possible to use thermosetting resin and low-vinyl polybutadiene systems which are co-extended.

The unsaturated polyester may itself be (pre) modified, for example by means of a high-vinyl polybutadiene as disclosed in our Belgian patent specification No. 792601; the high-vinyl polybutadiene thermosetting resin (i) may likewise be (pre) modified with unsaturated polyester alkyd as described in our Belgian patent specification No. 792602.

Preferably the low-vinyl polybutadiene has reactive terminal groups, more preferably hydroxy terminal groups.

The amount of low-vinyl polybutadiene used as modifier may vary within the above preferred range according to type, that is, the most highly preferred range for the weight of low-vinyl polybutadiene modifier present may be different for, say, an alkyd than for an aminoplast.

The modified resins of this invention can be used to produce moulding materials, by incorporation of filler(s), stabilizer(s), pigment(s), etc., and such compositions may comprise also a proportion of a polymerisable monomer (for example, up to 60% by weight of the total weight of the resin and monomer), for example styrene or diallyl phthalate. Filler will usually be present in an amount of at least 15 percent by weight of the total composition, preferably from 25 to 80%, and may comprise particulate inorganic material and/or fibrous reinforcement.

The moulding materials may be granular, or in the form of dough moulding compounds (DMC), sheet moulding compounds (SMC), or putties, and the invention is particularly applicable in the production of unsaturated polyester-based DMC's and SMC's.

In order that the present invention be better understood, it will now be described in greater detail with reference to the following examples, in which all 'parts' are by weight.

EXAMPLES 1 to 13

Table I hereafter sets forth details of the components of a number of moulding materials, Examples 1, 4, 7 and 9 being included for comparison. The method of compounding the compositions differs, depending on the components present, as follows:

a. Except when chain-extended resins were used, all the components of each composition were roughly blended together and then placed on differential rolls; chain-extended resin, gum-stocks, when used, were placed directly on differential rolls and a blend of the other components was then slowly added;
b. Compositions including resins containing a polymerisable monomer (for example styrene) were rolled warm at about 40° C; all other compositions were rolled hot at about 100° C; and
c. Rolling was continued for 3 minutes at a narrow nip of about 0.045 inch (1 mm) and then the compositions were sheeted-off at a nip of about 0.25 inch (6 mm).

The sheeted-off compositions may be kibbled and granulated to produce moulding compositions in easily handleable form.

TABLE I

| Component | Example |||||||||||||
|---|---|---|---|---|---|---|---|---|---|---|---|---|---|
| | 1* | 2 | 3 | 4* | 5 | 6 | 7* | 8 | 9* | 10 | 11 | 12 | 13 |
| Styrenated BEETLE 4128 resin (a) | 200 | 154 | 154 | — | — | — | 200 | 154 | — | — | — | 62.5 | — |
| BEETLE 4128 resin (alkyd) (a) | — | — | — | 200 | 150 | 150 | — | — | — | — | 52.5 | — | — |
| ARCO R45M resin (b) | — | — | 46 | — | — | 50 | — | — | — | — | — | — | — |
| Extended ARCO R45M gum stock (c) | — | 46 | — | — | 50 | — | — | 46 | — | 30 | 47.5 | 37.5 | — |
| Extended HYSTL G2000 gum stock (d) | — | — | — | — | — | — | — | — | 100 | 70 | — | — | — |
| T-butyl per benzoate | 10 | 10 | 10 | 10 | 10 | 10 | 5 | 5 | — | — | 5 | 5 | 10 |
| Dicumyl peroxide | — | — | — | — | — | — | — | 8 | 8 | — | — | — |
| A174 Silane surface treatment agent | 2.5 | 2.5 | 2.5 | 2.5 | 2.5 | 2.5 | — | — | 2.7 | 2.7 | 1.25 | 1.25 | 2.5 |
| M100 Calcined clay | 206 | 206 | 206 | 206 | 206 | 206 | — | — | 310 | 310 | 103 | 103 | 206 |
| Millicarb Calcium carbonate | 294 | 294 | 294 | 294 | 294 | 294 | — | — | — | — | 147 | 147 | 294 |
| Calofort T Calcium | | | | | | | | | | | | | |

TABLE I-continued

| Component | 1* | 2 | 3 | 4* | 5 | 6 | 7* | 8 | 9* | 10 | 11 | 12 | 13 |
|---|---|---|---|---|---|---|---|---|---|---|---|---|---|
| carbonate | — | — | — | — | — | — | 270 | 270 | — | — | — | — | — |
| Zinc stearate | 7 | 7 | 7 | 7 | 7 | 7 | 3 | 3 | 5.3 | 5.3 | 3.3 | 3.3 | 7 |
| Stearic acid | — | — | — | — | — | — | 2 | 2 | — | — | 1.7 | 1.7 | — |
| Coextended BEETLE 4128 resin (75%) and ARCO R45M (25%) resin gum stock (e) | — | — | — | — | — | — | — | — | — | — | — | — | 200 |

*Comparative Examples
Notes on Table I
(a) BEETLE is a Registered Trade Mark; 4128 resin is a poly (propylene maleate phthalate) - based material. When "styrenated", 33% by weight of the total is styrene monomer.
(b) ARCO R45M resin is a low molecular weight, low vinyl, hydroxyl terminated polybutadiene having 20% vinyl groups, an hydroxyl equivalent of about 1330 and a functionality of from 2.2 to 2.4, produced by American Atlantic Richfield Company.
(c) Extended ARCO R45M gum stock was produced by reaction of ARCO R45M with methylene diphenyl diisocyanate (MDI), Isonate 143L being used in the present examples, with the following formulation:
ARCO R45M resin 500 parts
Dibutyl tin dilaurate 0.4 parts
MDI 43.5 parts
NCO/OH ratio 0.804:1
The tin catalyst was mixed with the resin and the MDI added. The mixture was placed in a polyethylene bag and heated in an oven at 60°C for one hour. The resultant gum stock was rather sticky, soft and flowable, and was coated with a portion of the clay filler for ease of handling. The NCO/OH ratio may vary from resin to resin, 0.8:1 being preferred in the present case.
(d) HYSTL G2000 gum stock was produced from HYSTL G2000 resin (a high-vinyl polybutadiene resin produced by TRW, Inc.) according to the following formulation:
HYSTL G2000 resin 500 parts
Dibutyl tin dilaurate 0.4 parts
MDI 58.0 parts
NCO/OH ratio 1:
The G2000 resin was warmed to about 40°C to facilitate mixing, and the subsequent procedure was as described under (c) above for ARCO R45M gum stock.
(e) The co-extended gum stock was a styrenated polyester urethane-polybutadiene type of resin produced from the following formulation:
Styrenated BEETLE 4128 resin 384 parts
ARCO R45M resin 116 parts
Dibutyl tin dilaurate 1.06 parts
MDI 29.4 parts
NCO/OH ratio 0.91:1
($NCH/OH_{4128}$ = 1:1; $NCO/OH_{R45M}$ = 0.804:1)
The tin catalyst was mixed with the styrenated resin, followed by the MDI and the mixture reacted for five minutes to give an —NCO terminated polyester, whereafter the polybutadiene was added, stirring being continued for forty-five minutes. The resultant mixture was left overnight in a polyethylene bag at room temperature to yield a clear, sticky, soft gum stock.

EXAMPLE 14 (Comparative) and 15

A standard alkyd-modified high-vinyl polybutadiene moulding composition was used as comparison with the same material further modified by extended ARCO R45M gum stock. In Example 14 the moulding material used was BEETLE PBD moulding composition. The amount of modifier present was thus 22% by weight based on the resin components of the moulding composition.

The compositions described above were moulded in accordance with the conditions set forth in Table II, with the results listed therein.

TABLE II

| Condition/Property | 1* | 2 | 3 | 4* | 5 | 6 | 7* | 8 |
|---|---|---|---|---|---|---|---|---|
| Thermosetting resin/modifier ratio | 1:0 | 1:0.45 | 1:0.45 | 1:0 | 1:0.33 | 1:0.33 | 1:0 | 1:0.45 |
| Form of material used for moulding | P | P | P | HG | HG | SG | SP | SP |
| Moulding pressure (MN/m²) | 6.9 | 6.9 | 6.9 | 15.4 | 15.4 | 15.4 | 6.9 | 6.9 |
| At (temp) °C | 160 | 160 | 160 | 160 | 160 | 160 | 160 | 160 |
| Time (mins) | 1.5 | 1.5 | 1.5 | 3.0 | 3.0 | 3.0 | 1.5 | 1.5 |
| Appearance of moulding | Good | Good | Poor | Good | Good | Low Gloss | E | E |
| Mould shrinkage (mils/in) | 19.4 | 8.2 | 6.2 | 14.5 | 14.5 | 12.6 | 16.1 | 17.0 |
| Flexural strength (MN/m²) | 69 | 54 | 28 | 74 | 71 | 47 | 62 | 42 |
| Flexural Modulus (GN/m²) | 12.7 | 7.7 | 8.9 | 13.7 | 8.9 | 11.6 | 10.4 | 5.6 |
| Charpy impact unnotched (KJ/m²) | 3.3 | 5.0 | 2.3 | 3.9 | 6.0 | 2.7 | 2.9 | 5.1 |
| Charpy impact notched (KJ/m²) | — | 1.8 | — | 1.5 | — | — | — | 1.7 |
| ½ hour boiling water absorption (%) | 0.21 | 0.15 | 0.19 | 0.31 | 0.22 | 0.29 | — | — |
| Weight loss 1 week at 200°C (%) | 0.61 | 0.34 | 0.51 | 0.78 | 0.56 | 0.52 | — | — |

| Condition/Property | 9* | 10 | 11 | 12 | 13 | 14* | 15 |
|---|---|---|---|---|---|---|---|
| Thermosetting resin/modifier ratio | 1:0 | 1:0.43 | 1:0.9 | 1:0.9 | 1:0.45 | 1.0 | 1:0.36 |
| Form of material used for moulding | G | G | G | P | P | G | G |
| Moulding pressure (MN/m²) | 15.4 | 15.4 | 15.4 | 6.9 | 6.9 | 15.4 | 15.4 |
| At (temp) °C | 177 | 177 | 171 | 171 | 160 | 177 | 177 |
| Time (mins) | 3 | 3 | 5 | 5 | 2 | 3 | 3 |
| Appearance of moulding | Good | Good | Good | Fair | Good | Good | Good |

TABLE II-continued

|  |  |  |  |  |  |  |  |
|---|---|---|---|---|---|---|---|
| Mould shrinkage (mils/in) | 11.8 | 14.8 | 13.0 | 12.6 | 8.0 | 12.4 | 12.7 |
| Flexural strength (MN/m$^2$) | 113 | 92 | 39 | 40 | 60 | 73 | 73 |
| Flexural Modulus (GN/m$^2$) | 10.3 | 7.8 | 2.6 | 4.2 | 8.6 | 11.5 | 9.4 |
| Charpy impact unnotched (KJ/m$^2$) | 10.6 | 17.2 | 17.3 | 14.4 | 6.7 | 4.7 | 6.8 |
| Charpy impact notched (KJ/m$^2$) | 2.0 | 2.4 | 4.5 | 3.3 | 2.2 | — | — |
| ½ hour boiling water absorption (%) | 0.07 | 0.06 | 0.12 | 0.08 | 0.11 | — | — |
| Weight loss 1 week at 200° C (%) | 0.12 | 0.13 | 0.31 | 0.26 | 0.26 | — | — |

*Comparative Examples
Notes on Table II
P = Putty-like material
SP = Stiff putty-like material
HG = Hard granular
SG = Soft granular
G = Granular
E = Excellent From Table II it will be observed that chain extended low-vinyl polybutadiene-modified materials have improved flexibility and impact strength with respect to unmodified but otherwise equivalent materials, and that non-extended polybutadiene modifiers will be much less preferred from the point of view of achieving good finish. The chain-extended modifier is also more effective than the non-extended modifier in reducing water absorption of polyester (alkyd and styrene) and alkyd-based compositions. Mould shrinkage is reduced for clay/carbonate-filled polyester materials, but not for alkyd and high-vinyl polybutadiene materials, using both extended and non-extended modifier. Weight loss at elevated temperature may also be improved.

I claim:
1. A synthetic thermosetting resin comprising
   i. an unsaturated polyester thermosetting resin, and
   ii. 20 to 50 percent by weight, based on the total weight of (i) and (ii), of a polybutadiene selected from butadiene-based polymers having a vinyl content of up to 50 percent of the unsaturation thereof; hydroxyl-, carboxyl-, mercapto- and amino-terminated derivatives thereof.
2. The thermosetting resin of claim 1 wherein the unsaturated polyester resin of (i) is modified with a polybutadiene resin.
3. The synthetic thermosetting resin of claim 2 wherein the polybutadiene resin is a high vinyl type.
4. A thermosetting moulding material comprising a thermosetting resin as defined in claim 1 and at least 15% by weight (of the total weight of the material) of a filler.

* * * * *